United States Patent
Agarwal et al.

(10) Patent No.: US 9,615,216 B2
(45) Date of Patent: *Apr. 4, 2017

(54) FUTURE LOCATION-BASED COMMUNICATION WITH MOBILE DEVICES

(71) Applicant: International Business Machines Corporation, Armonk, NY (US)

(72) Inventors: Kanak B. Agarwal, Austin, TX (US); Patrick J. Bohrer, Austin, TX (US); Ahmed Gheith, Austin, TX (US); Michael D. Kistler, Austin, TX (US); Ramakrishnan Rajamony, Austin, TX (US); Brian L. White Eagle, Austin, TX (US); James Xenidis, Cedar Park, TX (US)

(73) Assignee: INTERNATIONAL BUSINESS MACHINES CORPORATION, Armonk ( * ) Notice: Subject to any disclaimer, the term of this patent is extended or adjusted under 35 U.S.C. 154(b) by 0 days.

This patent is subject to a terminal disclaimer.

(21) Appl. No.: 14/846,904

(22) Filed: Sep. 7, 2015

(65) Prior Publication Data
US 2017/0070859 A1   Mar. 9, 2017

(51) Int. Cl.
*H04W 4/02* (2009.01)
*H04W 64/00* (2009.01)
*H04W 4/16* (2009.01)

(52) U.S. Cl.
CPC ........... *H04W 4/028* (2013.01); *H04W 64/00* (2013.01); *H04W 4/16* (2013.01)

(58) Field of Classification Search
CPC ........ H04W 4/028; H04W 64/00; H04W 4/16
See application file for complete search history.

(56) References Cited

U.S. PATENT DOCUMENTS

| | | | | |
|---|---|---|---|---|
| 2004/0249649 | A1* | 12/2004 | Stratton | G06Q 30/04 379/114.03 |
| 2004/0249951 | A1* | 12/2004 | Grabelsky | H04L 29/06 709/227 |
| 2007/0189481 | A1* | 8/2007 | Cadiz | H04M 15/06 379/142.04 |
| 2011/0225585 | A1* | 9/2011 | Mealey | G06F 9/526 718/100 |

OTHER PUBLICATIONS

Appendix P.

* cited by examiner

*Primary Examiner* — Dinh P Nguyen
(74) *Attorney, Agent, or Firm* — Garg Law Firm, PLLC.; Rakesh Garg; William Stock

(57) ABSTRACT

For location-based communication with mobile devices, a condition is received at a device associated with a caller. The condition has to be satisfied by a callee at a future time and at a location, the location being a place where different callees with different mobile devices are present at different times. An instruction is received at the device for making a telecommunication call to the location where the callee is present with a mobile device and satisfies the condition at the future time. A set of potential callees is identified. Each mobile device associated with each callee in set of potential callees is present at the location at the future time, and each potential callee in the set of potential callees satisfies the condition. The telecommunication call is initiated to mobile devices associated with a subset of potential callees, the subset of potential callees including the callee.

19 Claims, 6 Drawing Sheets

FUTURE LOCATION-BASED COMMUNICATION WITH MOBILE DEVICES

TECHNICAL FIELD

The present invention relates generally to a method, system, and computer program product for telecommunications with mobile devices. More particularly, the present invention relates to a method, system, and computer program product for future location-based communication with mobile devices.

BACKGROUND

Mobile devices are usable for telecommunications, and proliferate all aspects of daily life. Users with mobile devices frequently travel to a variety of places for a variety of purposes. It is conceivable that regardless of what or where a place might be, if there is a human user in that place, it is very likely that the user has a mobile device on the user's person or otherwise available to the user with which to establish a telecommunications call (hereinafter, "call").

A call is any suitable method of telecommunication, including but not limited to audio telephonic communications, video telecommunications, textual messaging, taptically or haptically telecommunicating information, and generally telecommunication of data in these and other forms. Any type of mobile device can be used for a call. A mobile device is capable of relocating from one location to another as a user associated with the mobile device moves from one location to another. As some non-limiting examples, the mobile device can take the form of a cellular phone, a smartphone device, a tablet computer, a portable computing platform, a wearable device, and the like.

A typical call begins with a calling user (hereinafter, "caller") dialing a number associated with a mobile device associated with a called user (hereinafter, "callee"). The service provider connects the call between the caller's telecommunication device and the callee's mobile device. In some cases, the caller selects a callee's name, such as from a phonebook or a similar contacts management application, and the caller's device calls the number stored relative to the callee's name in the phonebook.

In some cases, a caller may not know the callee or a callee's number. A caller can use a directory service, whereby the caller identifies the intended callee by name, address, or both, and the directory service provides the callee's number to the caller, connects the call between the caller and the callee, or both.

The illustrative embodiments recognize that for the directory service to work using only the address, the callee's number has to be permanently associated with that address, even if the number is assigned to a mobile device. In other words, if a callee has to be reached only by knowing the callee's address, the callee's number must be unchangeably associated with the address, even if the device associated with the number is mobile.

The illustrative embodiments recognize that presently, there is no available method by which a caller could call any callee who may be present at a given location at a given time. In other words, if a caller were interested in calling anyone who may be present at or around a specified geographical location, during a given period, the caller will be able to call that location only if either a number is permanently associated with that location and the caller calls that number, or the caller calls a specific known callee whose presence at the location might be a known fact to the caller.

The illustrative embodiments recognize that such a deficiency in the present telecommunications systems are severely limiting in many circumstances. The illustrative embodiments recognize that under certain circumstances, a caller may want to call any callee who satisfies a location-related criterion. A location-related criterion is a criterion or condition, which may specify a location, or from which a location can be deduced, and which must be satisfied by a potential callee. For example, a caller might want to call anyone—even an unknown callee—who may be at the park after fifteen minutes or reach the park in fifteen minutes, to ask whether they see a child with a red sweater on the swing there at that future time. The park may not have a number associated therewith, and different callees may be present at the park at different times.

The callee's presence at a location—the park—is an example of a location-related criterion where the park is a location specified in the criterion. The callee's likely or actual presence at a location—the park—after fifteen minutes is an example of a future location—related criterion where the park is a location specified in the criterion and the presence there after fifteen minutes is a future time based condition that must be satisfied by the callee. Generally, a future time based condition is a condition that has to be satisfied at a time later than the time at which the condition is specified. A future time based condition can be satisfied by the caller, the callee, a third-party, a system, an event, or some combination thereof.

As another example, a caller might want to call anyone—even an unknown callee—who may be near a store, to ask whether the store has a line of patrons outside when the callee reaches the store. The callee's presence at a location—near the store, e.g., within certain distance of the store—is another example of a location-related criterion where the store may be specified but "near" the store may be an unspecified location in the location-related criterion. The "near the store" location may not have a number associated therewith, or even an address associated therewith. Furthermore, the "near the store" may not be a specific location but an area, such as an area defined by a radius or other geographical fence. Additionally, different callees, with different mobile devices, and with different numbers or identifiers, may be present in the area at different times.

"When the callee reaches the store" is a future time based condition that must be satisfied by the callee. In other words, not only should the callee satisfy a location criterion, but also a future time based condition, for the caller to select the callee for the call.

As another example, a caller might want to call anyone—even an unknown callee—if certain other types of location-related conditions or criteria are met by the callee, to exchange some information. For example, the caller might be interested in calling someone who will be stationary, i.e., not driving, and ask the callee about a landmark that is visible from the callee's future location. The callee being stationary at the callee's future location is another example of a combination of a location-related criterion and a future time based condition where the callee's location may or may not be specified in the location-related criterion. As in the other examples above, different callees, with different mobile devices, and with different numbers or identifiers, may be present at the callee's location at different times.

As another example, the caller might be interested in calling someone who is in a group of ten people or more, with a known person, such as a well known performer whose present location is available. However, the caller may not want to call anyone in the group until the known person has left the present location. The callee's presence with a group is another example of a location-related criterion where the location of the group is unspecified in the location-related criterion. The known person leaving the present location at a future time is a future time based condition that has to be satisfied for the location based call to occur in the future. Again, different callees, with different mobile devices, and with different numbers or identifiers, may be present with the known person at different times.

As another example, the caller might be interested in calling, at a future time, anyone who is presently situated at a present location so as to be able to reach a future location within a given amount of time. The callee's presence at the present location—from where the future location is reachable—is an example of a location-related criterion. The callee reaching the future location after the given amount of time is a future time based condition that has to be satisfied for the location based call to occur in the future. Again, different callees, with different mobile devices, and with different numbers or identifiers, may be within such a distance from the location at different times.

As another example, the caller might be a member of a household who may be interested in calling, at a future time, anyone who is situated at a location with another member of the household at a future time so as to be able to give a message or otherwise interact with the other member of the household at that future time. For example, such a situation may arise when the other member has forgotten his mobile phone and is not stationary at a predetermined location. The location of the other member of the household can be determined using a suitable mechanism other than a mobile device associated with the other member. For example, the other member's location is determinable at a store when the other member uses his credit card to make a purchase at the store. The callee may be another patron at the store. The callee's co-location with the other member of the household is an example of a location-related criterion and a future time based condition. Again, different callees, with different mobile devices, and with different numbers or identifiers, may be at the location at different times.

As another example, the caller might be interested in calling anyone near a lost pet to catch or corral the pet. The dog's location may be determined by a tracker in the pet's collar and the like. Because the pet is loose, the caller is interested in reaching different callees at different times according to the future travel path of the lost pet on an ongoing basis until the pet is captured. The callee's co-location near a future location of the pet at a future time is an example of a location-related criterion and a future time based condition. Again, different callees, with different mobile devices, and with different numbers or identifiers, may be at those different future locations at different times. A similar situation can arise with a lost child or with a lost item in a public transportation vehicle as well.

As another example, the caller might own a fleet of vehicles, one of which reports an on-board diagnostic issue over the air to the caller. The caller may be interested in calling, at a future time, any callee who is in or about the reporting vehicle's position at the future time, and not driving at that future time. The future location of the reporting vehicle can be determined using a suitable mechanism such as by using a Global Positioning System (GPS) tracker associated with the vehicle. The callee may be an employee who is a passenger in the vehicle and the future time may be when the vehicle is close to a repair facility. The callee being an employee who is a passenger and the callee's future co-location with the vehicle near the repair facility is an example of a combination of a location-related criterion and a future time based condition. Again, different callees, with different mobile devices, and with different numbers or identifiers, may be at the location at different times.

As another example, the caller might own a fleet of vehicles, one of which reports an on-board diagnostic issue over the air to the caller. The caller may be interested in calling, at a future time, any callee who is in or about the reporting vehicle's position at the future time, and performing a certain role at that future time. The callee may be a dock employee who guides incoming vehicles to various locations in the dock. The future time may be when the vehicle is at the dock. The callee being a dock employee who is at the dock location meeting the vehicle when it arrives at the dock, to guide the vehicle to the repair facility is an example of a combination of a location-related criterion and a future time based condition. Again, different callees, with different mobile devices, and with different numbers or identifiers, may be within at the location at different times. Furthermore, one dock employee responding may squelch the call on other dock employee's devices at that future time.

As another example, the caller might want to call any member of a lunch group from his office that may be at a particular restaurant at 12:30 PM today so that the member may pick up the caller's lunch from that restaurant. The callee being at the restaurant at 12:30 PM and the callee being a member of a lunch group is an example of a combination of a location-related criterion and a future time based condition. Again, different callees, with different mobile devices, and with different numbers or identifiers, may be at the location at different times.

As another example, the caller might want to call any member of a group at a specified location when no one at that location is talking on their phones. The callee being at the location and a time when no one is talking on the phone is an example of a combination of a location-related criterion and a future time based condition. Again, different callees, with different mobile devices, and with different numbers or identifiers, may be at the location at different times.

As another example, the caller might want to call any callee at a specified location when the caller reaches a different location. The callee being at the specified location at a time when the caller reaches the second location is an example of a combination of a location-related criterion and a future time based condition. Again, different callees, with different mobile devices, and with different numbers or identifiers, may be at the location at different times.

As another example, the caller might want to call any callee who is a heart specialist near the caller's location when the caller experiences the symptoms of a heart attack. The callee being a heart specialist near whichever location is the site of the future heart attack is an example of a combination of a location-related criterion and a future time based condition. The callee's qualifications—e.g., a heart specialist—can be determined by any suitable methods, including but not limited to public information associated with the callee's mobile device number. Again, different callees, with different mobile devices, and with different numbers or identifiers, may be at the location at different times.

Generally, the caller might be interested in calling one or more than one callee who may be located in an area or location during a given future period and satisfies a caller-specified condition during that future period. Furthermore, the caller may want at least n callees to respond, no more than n callees to respond, n or more callees to respond, or some combination thereof. Furthermore, the caller may want one or more responses within a given period. Not only could different callees, with different mobile devices, and with different numbers or identifiers, be present at the location during the period, but also the group of potential callees may change during the period as callees enter and leave the area.

Furthermore, in some cases the location that has to be called may be determined or be determinable before the future time based condition is satisfied at a future time. In some other cases, the location that has to be called may not be determined or be determinable until the future time based condition has been satisfied at a future time. Additionally, in either type of cases, not just one but any number of conditions may have to be satisfied at the future time.

These examples situations are not intended to be limiting. From this disclosure, those of ordinary skill in the art will be able to conceive many other situations where such calls are desirable and the same are contemplated within the scope of the illustrative embodiments.

The illustrative embodiments recognize that presently available methods of calling are severely limited in establishing a call in these and other similar circumstances. Thus, a solution for calling one or more transient callees or callee-associated mobile devices based on the mobile device's location and a condition being satisfied at a future time is needed and will be beneficial.

SUMMARY

The illustrative embodiments provide a method, system, and computer program product for future location-based communication with mobile devices An embodiment includes a method for location-based communication with mobile devices. The embodiment receives, at a device associated with a caller, a condition, wherein the condition has to be satisfied by a callee at a future time and at a location, the location being a place where different callees with different mobile devices are present at different times. The embodiment receives, at the device, an instruction for making a telecommunication call to the location, wherein the callee is present with a mobile device at the place at the future time and satisfies the condition at the place at the future time, therefore the call is made to the mobile device of the callee in order to call the location. The embodiment identifies a set of potential callees, wherein each mobile device associated with each callee in the set of potential callees is present at the location at the future time, and wherein each potential callee in the set of potential callees satisfies the condition. The embodiment initiates, using a processor and a memory in the device associated with the caller, the telecommunication call to mobile devices associated with a subset of potential callees, the subset of potential callees including the callee. Thus, the embodiment allows connecting a caller to a callee, from a dynamic group of callees, by only knowing a location, where no identifier may be statically associated with the location, and when the callee satisfies a condition in the future at the location.

Another embodiment further receives the set of potential callees at the device of the caller. The embodiment determines that different potential callees in the set of potential callees satisfy the condition to different degrees of satisfaction at the future time. The embodiment selects, at the device of the caller, the subset of potential callees such that each potential callee in the subset satisfies the condition to a corresponding degree that exceeds a threshold degree of satisfaction of the condition, wherein the subset of potential callees includes the callee. Thus, even though the callees may be unknown to the caller and transient at the location, the embodiment allows the caller to apply a degree of satisfaction of the condition as a selection criteria in connecting with one or more of those callees.

Another embodiment further receives the set of potential callees at the device of the caller. The embodiment determines that different potential callees in the set of potential callees satisfy the condition at different times. The embodiment selects, at the device of the caller, the subset of potential callees such that each potential callee in the subset satisfies the condition at the future time, wherein the subset of potential callees includes the callee. Thus, even though the callees may be unknown to the caller and transient at the location, the embodiment allows the caller to apply a time of satisfaction of the condition as a selection criteria in connecting with those callees.

Another embodiment further receives the condition as a part of receiving a set of conditions, where the condition is a part of a subset of the set of conditions that has to be satisfied by the callee at the future time and at the location, where each location in a set of different locations is accepted as the location for satisfying the condition, and where the potential callees in the set of potential callees are present at the different locations in the set of different locations. Thus, even though the callees may be unknown to the caller and transient at the location, the embodiment allows the caller to apply a location of satisfaction of the condition as a selection criteria in connecting with those callees.

Another embodiment further identifies an identifier of a particular mobile device of a particular potential callee in the subset of potential callees only by using a location of the particular mobile device at the future time when the particular potential callee satisfies the condition. The embodiment determines that the particular potential callee satisfies the condition by detecting a state of the particular mobile device. Thus, the embodiment allows connecting a caller to a callee only by virtue of the callee's presence at the location and time of the satisfaction of the condition and the callee's device being in a particular state.

In another embodiment, the mobile device has an associated identifier, and wherein the callee, the mobile device, and the identifier change at the location at a second time. Thus, the embodiment allows connecting a caller to a transient callee who is present at the given location only for a period.

Another embodiment further determines, when the instruction includes a criterion that must be satisfied by the callee, whether the criterion specifies the location. The embodiment resolves, when the criterion does not specify the location, the criterion to the location. Thus, the embodiment allows connecting a caller to a callee where the callee is unknown, the callee's device's identifier is unknown, and the callee's location is also unknown, but the callee satisfies a condition from which a location where the callee is present can be determined at a future time and the caller and callee can be connected via a telecommunication channel.

Another embodiment further determines that the instruction includes a location-related criterion that must be satisfied by the callee. The embodiment determines that the location is ascertained when the condition is satisfied at the future time. The embodiment resolves, the criterion to the location after the condition is satisfied at the future time. Thus, the embodiment allows connecting a caller to a callee where the callee is unknown, the callee's device's identifier is unknown, and the callee's location is also unknown, but the future satisfaction of the condition establishes the location, where the callee can be called.

In another embodiment, an identifying information of any potential callee in the subset of potential callees is unknown to the caller, and wherein an identifier of any mobile device of any potential callee in the subset of potential callees is also unknown to the caller. Thus, the embodiment allows connecting a caller to a callee where the callee is unknown, the callee's device's identifier is unknown, and the callee is selected only based on a condition that the callee satisfies at a future time at some location.

Another embodiment further transmits the instruction to a service provider system. The embodiment receives, from the service provider system, at the device associated with the caller, and at the future time, an indication that each mobile device associated with each potential callee in set of potential callees is present at the location. The embodiment determines, at the device associated with the caller, that each potential callee in the subset of potential callees satisfies the condition, thereby selecting the subset of potential callees. Thus, the embodiment allows a caller's device to determine that a condition has been satisfied, to receive a set of potential callees from a service provider at a location, and call a callee at the location.

Another embodiment further transmits the instruction and the condition to a service provider system. The embodiment receives, from the service provider system, at the device associated with the caller, and at the future time, a first indication that each mobile device associated with each callee in set of potential callees is present at the location. The embodiment receives, from the service provider system, at the device associated with the caller, and at the future time, a second indication that each potential callee in the subset of potential callees satisfies the condition, thereby selecting the subset of potential callees. Thus, the embodiment allows a caller's device to specify the condition that has to be satisfied, and a remote system detects the satisfaction of the condition by a set of callees at a future time.

Another embodiment includes a computer usable program product comprising a computer readable storage device including computer usable code for location-based communication with mobile devices. Thus, the embodiment creates a software product to make location calls based on a future satisfaction of a condition.

Another embodiment includes a data processing system for location-based communication with mobile devices. Thus, the embodiment creates a system to make location calls based on a future satisfaction of a condition.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
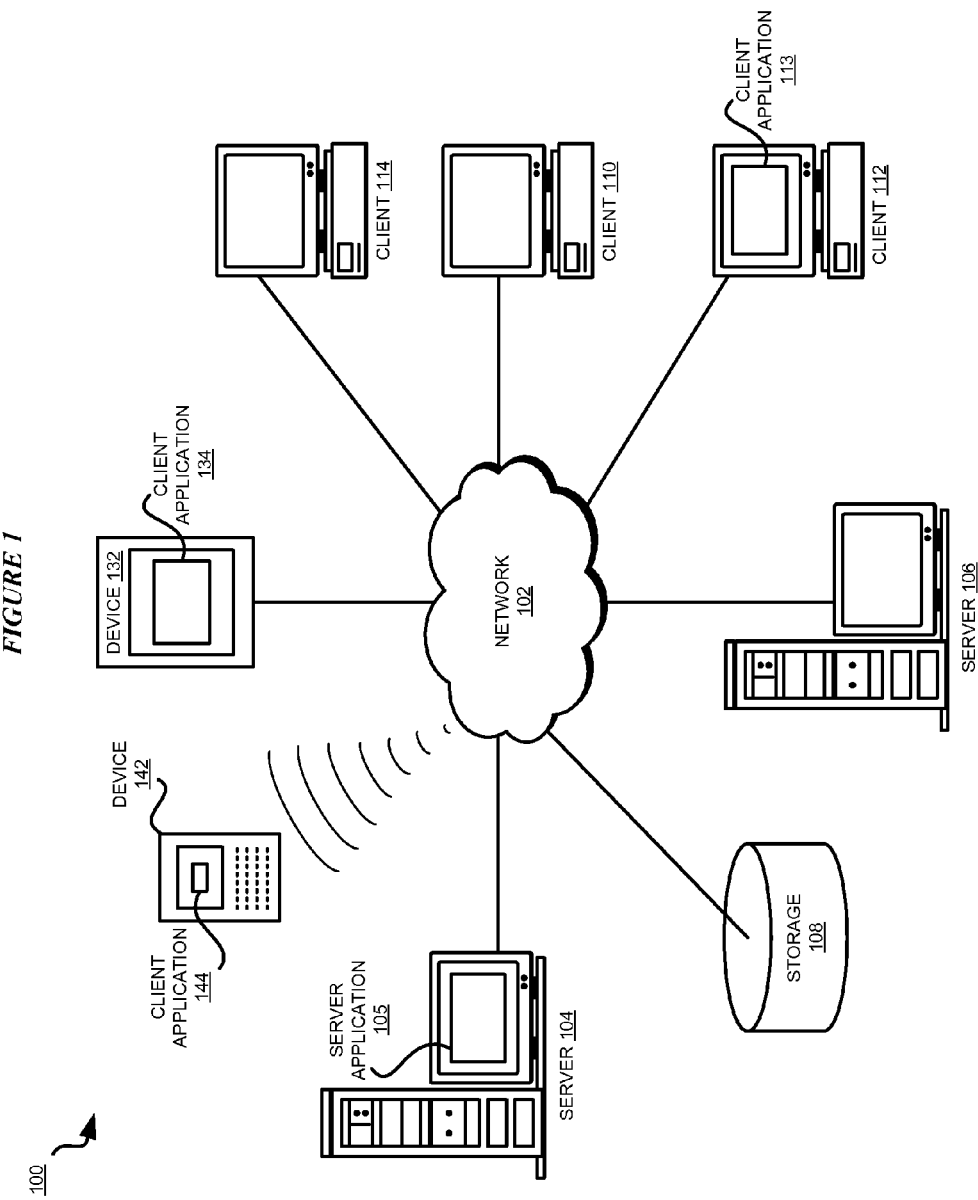
FIG. 1 depicts a block diagram of a network of data processing systems in which illustrative embodiments may be implemented.

The illustrative embodiments used to describe the invention generally address and solve the above-described problems and other problems related to calling one or more transient and unknown callees based on the callees' location at a future time subject to a condition that is satisfied at the future time. The illustrative embodiments provide a method, system, and computer program product for future location-based communication with mobile devices.

Within the scope of the illustrative embodiments, a location call is a call placed by one caller to one or more transient and unknown callees based on the callees' location. From the caller's perspective, the location call is an outbound location call. From a callee's perspective, the location call is an inbound location call.

Within the scope of the illustrative embodiments, a location includes a precisely specified geographical point, a description of a structure or landmark located in a geographical region, a defined and bound geographical area, a geographical point or area that meets a criterion or condition, or some combination thereof.

Within the scope of the illustrative embodiments, a future time based condition can be satisfied in many ways. For example, a future time based condition is satisfied when the caller causes the caller's mobile device to enter a state, such as a state of reaching a location. As some other examples of satisfying a future time based condition by causing a mobile device to enter a state include but are not limited to—a state of reaching a location or reaching another point relative to the location; a state of completing a task on the device or on another system via the device; a state of becoming stationary, non-moving, or moving at a different velocity as compared to a previous velocity of the device; and causing an activity to occur on or from the device.

An embodiment can be implemented as an application to execute on a mobile device. One embodiment enables a caller to place an outbound location call. Another embodiment enables a callee to respond to, accept, or otherwise handle an incoming location call. Another embodiment is configured to facilitate features described with respect to both—outbound location calls and inbound location calls.

An embodiment detects that the caller wishes to initiate a location call. For example, according to one embodiment in which the location of the call can be selected before a future time based condition is satisfied at a future time, a caller selecting an area or a location on a map application triggers the detection that the caller wishes to initiate a location call. For example, the caller may point to, or draw on a map presentation to select an area or a location. A profile configuration of the caller or another selection tool allows the caller to specify the size of the area, such as by selecting a default or specified radius from the pointed-to location. For example, when the caller points to a location on a map, a pre-configured preference selects an area of n feet radius centered at the selected location. As another example, when the user selects an office building, the entire office campus, multiple campuses of the office, or a pre-defined area therein, may be selected.

According to another embodiment in which the location of the call can be selected before a future time based condition is satisfied at a future time, a caller inputting a description of an area or a location, such as via a natural language interface, triggers the detection that the caller wishes to initiate a location call. For example, a caller can speak a description into an audio input interface, type a question in a natural language, such as, for example, "who is at the park?" or "call someone at the Smith party," or "can anyone tell me whether the light at the intersection of First street and Avenue K is still out?"

According to another embodiment in which the location of the call can be selected before a future time based condition is satisfied at a future time, a caller selecting or highlighting a description of an area or a location, such as on a calendar application, triggers the detection that the caller wishes to initiate a location call. For example, if the caller selects a meeting on the caller's calendar, a location of the meeting is automatically selected.

In some cases, the location of the call is not determined until a future time based condition is satisfied at a future time. When the condition is satisfied or met at the future time, the location can be selected, implied, deduced, or otherwise determined using the above location selection methods and other methods.

For example, an embodiment detects that the caller wishes to initiate a location call with a future time based condition. For example, according to one embodiment in which the location of the call not determined until a future time based condition is satisfied at a future time, a caller performing a task or operation that can be construed as a future time based condition triggers the detection that the caller wishes to initiate a location call. For example, the caller may specify a search term or a natural language input with a temporal aspect. Some non-limiting examples of such inputs include "when <something happens> . . . " or "at the time of <something> . . . " or "if <something> happens . . . " and many other possible other variations for a similar purpose.

A profile configuration of the caller or another selection tool allows the caller to specify when such an input is to be construed as a future time based condition for a location call. For example, the caller may configure in the profile that when the caller provides an input with a temporal aspect in specific one or more applications, the input should be construed as a future time based condition for a location call.

According to another embodiment in which the location of the call is determined when a future time based condition is satisfied at a future time, a caller expressly inputting a description of a future time based condition, such as via a natural language interface, triggers the detection that the caller wishes to initiate a location call based on a future time based condition. For example, a caller can speak a description into an audio input interface, type a question in a natural language, such as, for example, "who is going to be near my lost pet in fifteen minutes?" or "call someone in the lunch group wherever the lunch group may be at 12:30 PM to pickup lunch for me," "call someone on the tour when John has joined (or left) the tour," or "when I am headed in that direction, can anyone tell me whether the light at the intersection of First street and Avenue K is still out?"

According to another embodiment in which the location of the call can be selected before a future time based condition is satisfied at a future time, a caller selecting or highlighting a description of a future event, such as on a calendar application, triggers the detection that the caller wishes to initiate a location call based on the occurrence of the future event. For example, if the caller selects a future meeting on the caller's calendar, a location of the meeting is automatically selected.

An embodiment further presents the caller a user interface from where the caller can configure a number of criteria or conditions, including location criteria and future time based conditions, for the outbound location call. For example, according to one embodiment, the caller can specify when the potential callees should be present at the location and which condition should be satisfied at that time. As another example, according to another embodiment, the caller can specify how many potential callees should be present at the location. According to another embodiment, the caller can specify how many potential callees should respond to the location call. According to another embodiment, the caller can specify a timeout period within which a potential callee should respond; otherwise the location call should be terminated. According to another embodiment, the caller can specify the request the caller has for a callee who answers the location call, e.g., a text message that should be presented to the callee who accepts the location call.

An embodiment transmits the location information if available, a present or future criterion from which to determine the location, a future time based condition that should be satisfied, or some combination thereof, to a service provider whose network will be utilized for the location call. Whether a future time based condition has been satisfied at a future time can be determined by the caller's device, the service provider, or both.

When the future time based condition is such that the caller's device determines the satisfaction of the condition, e.g., when the caller will have done something, the future time based condition is not sent to the service provider, but evaluated on the caller's device. When the future time based condition is satisfied at a future time, the location information, the criterion, or both, are sent to the service provider.

When the future time based condition is such that the a service provider's system determines the satisfaction of the condition, e.g., when a callee will have done something, the future time based condition is sent to the service provider, and not evaluated on the caller's device. When the future time based condition is configured, the location information, the criterion, and the future time based condition are sent to the service provider.

A server application on the service provider's network receives the location, the criterion, or some combination thereof. The server application identifies one or more mobile devices that are, were, will likely be, or will be, situated at the specified location at the specified time.

When the future time based condition has to be evaluated by the server application, the server application on the service provider's network also receives the future time based condition. The server application identifies one or more mobile devices that are, will likely be, or will be, able to satisfy the future time based condition at a future time. The server application computes a location where those devices will be situated at the future time when they satisfy the condition.

As some non-limiting examples, a mobile device's geographical location can be established by receiving from the mobile device its GPS coordinates and a travel trajectory, by triangulating the mobile device's position and trajectory from the cellular or wireless network base stations, or by detecting proximity to a wireless networking beacon or access point which is itself in a known location.

The server application prepares a callee list. The callee list includes the identified mobile devices and their associated identifiers or numbers. Each callee associated with an identified mobile device is a potential callee who satisfies the future time based condition and is at either a specified location or a determined location, as the case may be.

In one embodiment, the server application provides the callee list to the application executing on the caller's device. In such an embodiment, an identity of a potential callee, an identifier or number of a potential callee's mobile device, a normalized form of the identity or identifier, or some combination thereof, are revealed to the caller. Even though the potential callees are unknown to the caller, the caller is able to select one or more potential callees, reject one or more callees, or both, based on some caller-determined criteria.

As one example, assume that several callees are listed as potential callees on the list sent to the caller. Different potential callees may satisfy the future time based condition differently, such as to different degrees, at different future times, or both. One non-limiting example caller-determined criterion for selecting a potential callee from the list can be a degree to which that callee satisfies the future time based condition, a future time at which that callee satisfies the future time based condition, or both.

Note that the selection of some potential callees from a callee list need not be an overt action on the part of the caller. In one embodiment, configuration information used by the embodiment can automatically select or reject a potential callee from a callee list when the callee list is available from the service provider.

In another embodiment, the server application does not provide the callee list to the application executing on the caller's device, but selects one or more callees at the server application. In such an embodiment, an identity of a potential callee, an identifier or number of a potential callee's mobile device, or some combination thereof, are not revealed to the caller. The caller is not able to select or reject one or more potential callees, but the server application does the selection or rejection on the caller's behalf.

Again, as one example, assume that several callees are listed as potential callees on the list sent to the caller. Different potential callees may satisfy the future time based condition differently, such as to different degrees, at different future times, or both. One non-limiting example manner of selecting a potential callee on the server application can be a degree to which that callee satisfies the future time based condition, a future time at which that callee satisfies the future time based condition, or both.

One or more callees, who satisfy the future time based condition at a time and location according to a location criterion and a future time based condition, are selected in one of the manners described herein. An embodiment creates an instruction to initiate the location call. For example, one embodiment passes, as instructions to the server application, the selected callees, if a selection was made by the caller from the callee list. As another example, another embodiment passes, as instructions to the server application, any data, such as a text message, that the caller has configured to provide to a callee who accepts the location call.

Either to a caller-selected list of potential callees when the caller selects some potential callees, or to all potential callees in the callee list created by the server application, the server application initiates the location call using the instructions. Optionally, if an embodiment has provided any data to be transmitted to a callee, the server application passes such data to each callee mobile device with which the location call is initiated.

An embodiment allows inbound location call configuration for a callee. A user who could be a potential callee for a future location call can configure the embodiment with one or more preferences for the handling of such future location call. For example, a user can configure the embodiment with a black zone. A black zone is a location or area where the user does not want to participate in one or more location calls.

The user can further configure specific properties of the location calls in which the user does not want to participate while the user's mobile device is located in the black zone. A user can also configure a time period when the user does not participate in location calls while in the black zone. A user can also configure a time period, i.e., a Do Not Disturb (DND) period, when the user does not participate in location calls regardless of where the user is located. A user can also configure a whitelist (or a blacklist) of potential caller's, from any of whom a location call is acceptable (not acceptable).

An embodiment enables a potential callee to configure a combination of these and other similar configuration parameters. These examples of callee configurations are not intended to be limiting. From this disclosure, those of ordinary skill in the art will be able to conceive many other configuration parameters that can be configured in a similar manner, and the same are contemplated within the scope of the illustrative embodiments.

An embodiment further manages the mobile device associated with a potential callee, such as to manage the callee's privacy-related preferences. For example, a callee might want to not participate in a location call not only by rejecting a location call but also by configuring the mobile device in such a way that the mobile device will not be included in a callee list for a specified location. For example, one embodiment hides or otherwise prevents the mobile device's location to become known to the server application. Thus, when the server application does not have the location information of a mobile device, the server application cannot include the mobile device in a callee list. As another example, another embodiment masquerades the mobile device's location, such as by manipulating the device's location such that the device appears to be at a location other than the device's actual location.

An embodiment can manage the mobile device on which the embodiment is implemented such that the mobile device's behavior can be modified in a variety of ways. For example, an embodiment can modify the mobile device's behavior differently for different incoming location calls, based on a present location of the device when an location call is received, based on time when an location call is received, based on a source or caller of a location call (when the caller is identified to the callee), or some combination of these and other factors.

An embodiment further transmits one or more callee preferences described herein to a service provider. Such a transmission allows or prevents a server application from including the user's mobile device in a list of potential callees.

When an inbound location call is received at the mobile device, an embodiment allows a variety of call handling options to the callee. For example, the embodiment allows the callee to accept or answer the call, decline or reject the call, allows the call to fail, or manipulate a configuration parameter of the device such that the device no longer complies with a requirement of the location call.

If the callee accepts a location call, an embodiment further responds to the caller with any data that may be requested from the callee. For example, the embodiment can capture and transmit an image of a surrounding where the mobile device is present. As another example, an embodiment can transmit a message or a disclaimer to the caller before the callee and the caller communicate in the call. An embodiment can make these and other similarly purposed data transmissions at the beginning of the location call, during the location call, prior to a termination of the location call, or even after a location call has terminated.

For example, using an embodiment, a caller may wish to perform a poll by asking a group of potential callees whether they prefer corn chips or potato chips. The caller may leave the poll open for five minutes after which the poll closes and the location call ends. The embodiment then summarizes the results of the poll and transmits to some or all callees. For example, the result data may be transmitted to only those callees who participated in the poll, or to all potential callees in the group. Such a transmission of the result data would be a transmission done after the location call terminates. Those of ordinary skill in the art will be able to conceive may other circumstances of data transmissions that occur at the beginning of the location call, during the location call, prior to a termination of the location call, or even after a location call has terminated, and the same are contemplated within the scope of the illustrative embodiments.

A method of an embodiment described herein, when implemented to execute on a device or data processing system, comprises substantial advancement of the functionality of that device or data processing system in calling a mobile device based on the device's location and the satisfaction of a future time based condition. For example, prior-art requires that a caller be able to identify a callee either by an identity of the callee or by a fixed association of a telecommunication identifier, e.g., a phone number, with a location. An embodiment enables a caller to make a location call without knowing the identity of a callee at a location, without the location being associated with any particular telecommunication identifier, or both. Furthermore, an embodiment enables a caller to specify a condition that a callee has to satisfy at a future time to be eligible as a callee. Operating in a manner described herein, an embodiment performs future location-based communication with mobile devices. Such manner of operating a telecommunication system is unavailable in presently available devices or data processing systems. Thus, a substantial advancement of such devices or data processing systems by executing a method of an embodiment facilitates future condition based calls to a transient and dynamic set of callees based on a location of the set of callees.

The illustrative embodiments are described with respect to certain applications, circumstances, locations, areas, configurations and parameters, time periods, transmissions, criteria, conditions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
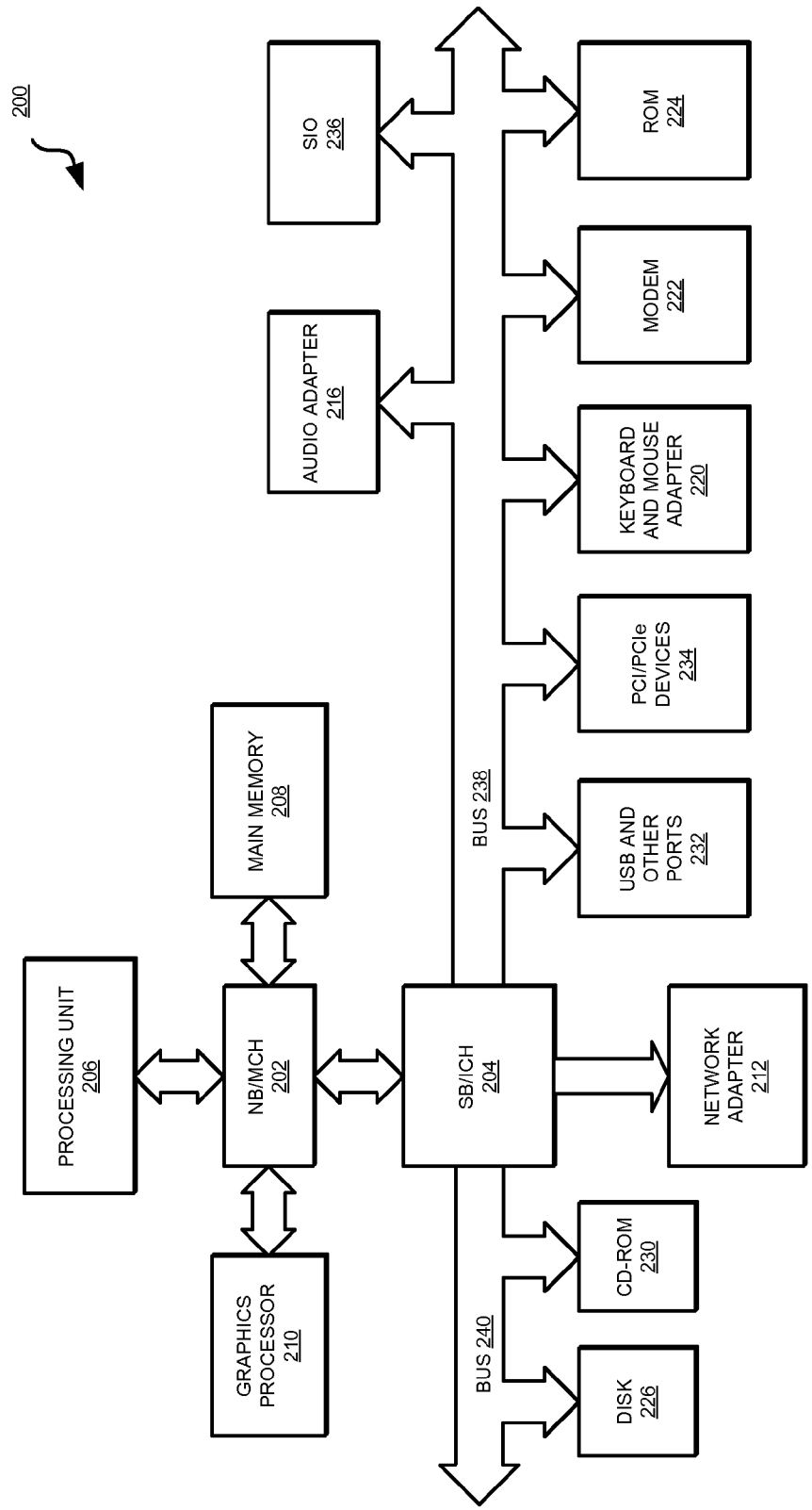
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired communication links, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Device 132 is a mobile device according to an embodiment, e.g., a tablet computer. Device 142 is another example of a mobile device, such as a smartphone. Client 112 is an example of a telecommunication device, including but not limited to a mobile device. Client applications 113, 134, and 144 each implements an embodiment described herein. As a non-limiting example, client application 134 may implement certain callee oriented features of one or more embodiments described herein. As another non-limiting example, client application 144 may implement certain caller oriented features and certain callee oriented features of one or more embodiments described herein. As another non-limiting example, client application 113 may implement certain caller oriented features of one or more embodiments described herein. Generally, a client application can implement any combination of caller oriented features and callee oriented features without limitation. Server application 105 is an application that executes on the server-side of a service provider's network in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 and 142 in FIG. 1 in which computer usable program code or instructions implementing the processes of the illustrative embodiments may be located. Data processing system 200 is described as a computer only as an example, without being limited thereto. Implementations in the form of other devices, such as device 132 and 142 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as server application 105 in FIG. 1 and client applications 113, 134, and 144 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
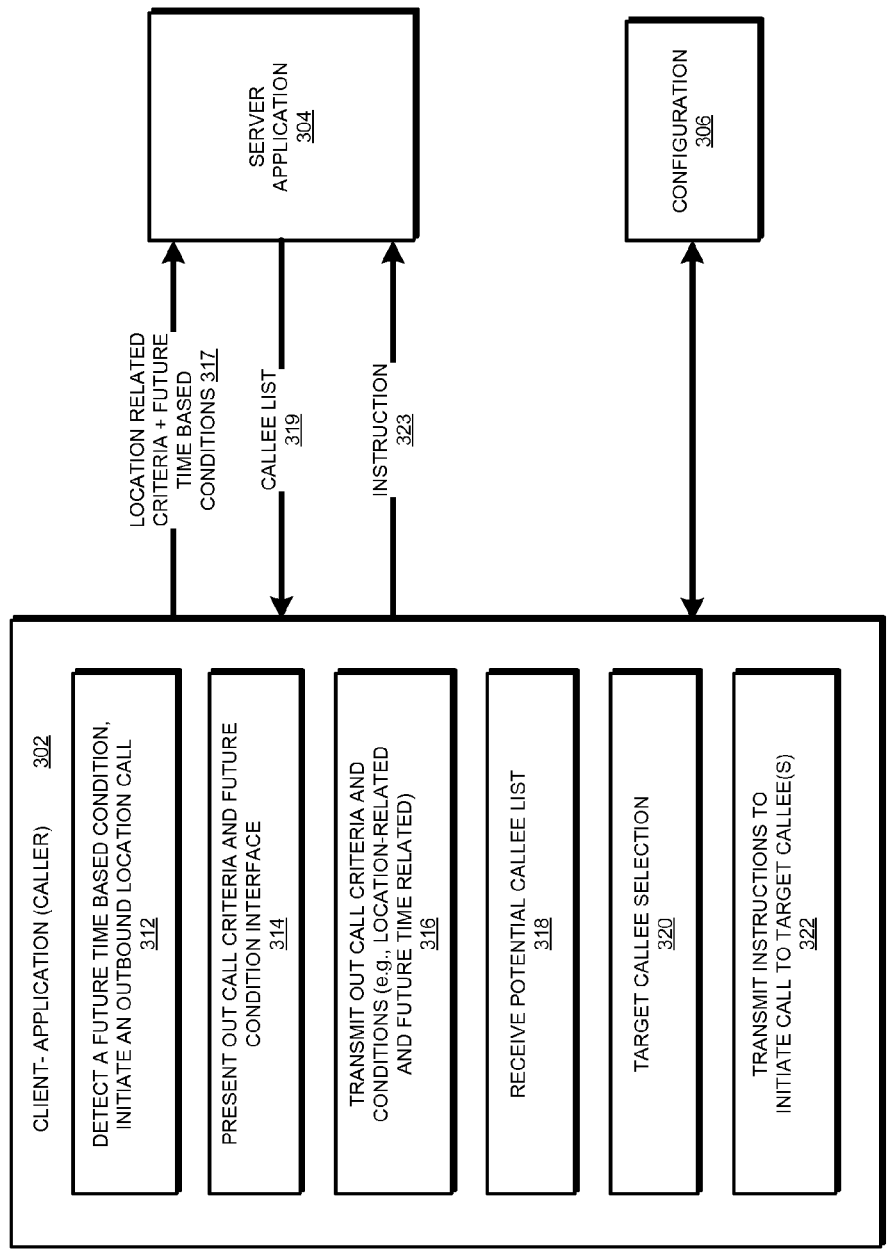
FIG. 3 depicts a block diagram of example caller oriented features for future location-based communication with mobile devices in accordance with an illustrative embodiment.

With reference to FIG. 3, this figure depicts a block diagram of example caller oriented features for future location-based communication with mobile devices in accordance with an illustrative embodiment. Application 302 is an example of any of client applications 134, 144, or 113 in FIG. 1. Server application 304 is an example of server application 105 in FIG. 1.

Component 312 detects that a caller is initiating a location call. For example, component 312 detects that a map application has been opened, a meeting notice is presented, or a location is input in natural language, on the device where application 302 is executing.

In one embodiment, component 312 also detects that the caller is specifying a future time based condition for a location call. For example, component 312 detects that the caller has provided an input at a certain application and the input has a temporal aspect in the manner described elsewhere in this disclosure.

Component 314 presents an outbound call criteria selection interface. Any parameters of the outbound location call can be specified using the interface presented by component 314. In some cases, component 314 saves a criterion that has been input by the caller on the interface as a preference in configuration 306. In some cases, component 314 presents as a pre-configured criterion, a preference that has been previously saved in configuration 306.

In one embodiment, component 314 presents an interface through which the caller can expressly specify or input a future time based condition as well. For example, instead of component 312 detecting an input with a temporal aspect being made at another application, component 314 presents an interface through which the caller can input the future time based condition to be used with a location call. In one embodiment, the input with temporal aspect, as detected by component 312, can be used to pre-populate the interface presented by component 314. The caller can accept, reject, or modify the input for use as a future time based condition for a location call.

Component 316 transmits the one or more outbound location call criteria (317) to server application 304. Optionally, as described elsewhere in this disclosure, when server application 304 has to evaluate whether a future time based condition has been satisfied, component 316 also sends the future time based condition (317) detected or collected by component 312 and/or 314 to server application 304.

When callee list 319 is available to application 302, component 318 receives callee list 319 from server application 304. In some cases, component 318 may prepare and send a request to server application 304 for callee list 319.

Component 320 enables the caller to select one or more potential callees from callee list 319. In some cases, component 320 automatically selects one or more potential callees, automatically rejects one or more potential callees, or both, based on a preference saved in configuration 306. For example, given a callee list, one embodiment can select a target callee from the callee list based on a degree to which the target callee satisfies the future time based condition, the future time at which the target callee satisfies the condition, the location from which the target callee satisfies the condition, or some combination thereof.

As an example, the embodiment may select one callee over another callee from the callee list if a degree to which the first callee satisfies the future time based condition, the future time at which the first callee satisfies the condition, the location from which the first callee satisfies the condition, or some combination thereof, is preferable over the degree to which the second callee satisfies the future time based condition, the future time at which the second callee satisfies the condition, the location from which the second callee satisfies the condition, or some combination thereof.

As another example, in another embodiment, given a callee list, the embodiment can identify whether anyone on the callee list is also in a contacts list accessible to the caller's device. From this disclosure, those of ordinary skill in the art will realize that configuration 306 may be dynamically computed by application 304 based on information from the Internet such as a social media network.

Component 322 prepares an instruction to initiate the outbound location call. For example, component 322 collects from the caller any messages that are to be delivered to a callee, any limitations on the location call such as a timeout or a number of responding callees, and transmits them as one or more instruction 323 to server application 304.

Figure 4:
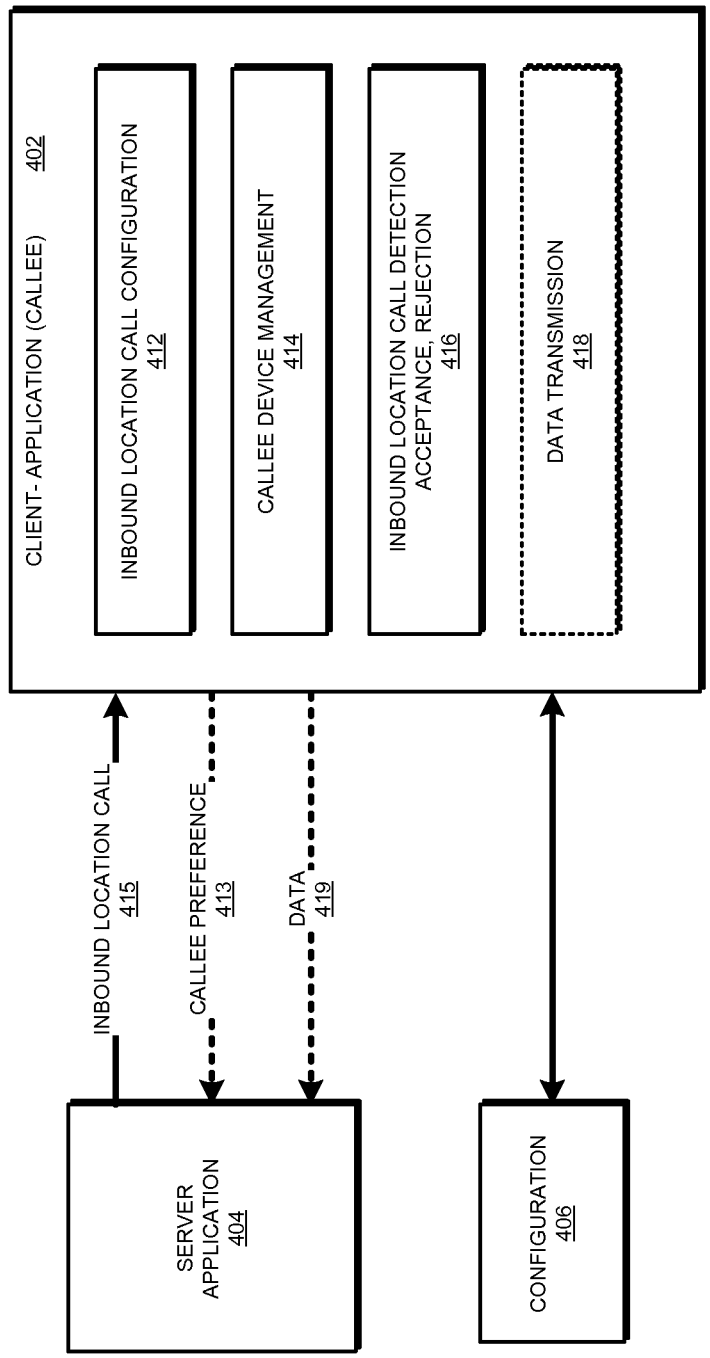
FIG. 4 depicts a block diagram of example callee oriented features for future location-based communication with mobile devices in accordance with an illustrative embodiment.

With reference to FIG. 4, this figure depicts a block diagram of example callee oriented features for future location-based communication with mobile devices in accordance with an illustrative embodiment. Application 402 is an example of any of client applications 134, 144, or 113 in FIG. 1. Application 402 can also be implemented together with the features of application 302 in FIG. 3, in the form of a single application. Server application 404 is an example of server application 304 in FIG. 3.

Component 412 allows a potential callee to configure application 402, the mobile device where application 402 is executing, or both, how the callee would like to handle an inbound location call. A configuration preference provided by the callee is saved in configuration 406. Component 412 may also present to the callee a parameter from configuration 406 as a default configuration or a previously saved preference of the callee. Component 412 may also alter a callee preference based on a time, a location of the callee's device, or a combination thereof, and update configuration 406 accordingly. Optionally, component 412 may send (413) one or more preferences to server application 404.

Component 414 configures the mobile device where application 402 is executing. Particularly, component 414 configures the mobile device to observe or enforce a black zone, DND and other periods, location hiding, location obfuscation or masquerading, and other device configurations described herein.

Server application 404 sends inbound location call 415, or an indication thereof, to application 402. For example, inbound location call 415 may result from instruction 323 sent from application 302 in FIG. 3.

Component 416 detects inbound location call 415. Component 416 accepts, rejects, or allows a failure, of call 415 according to callee preferences in configuration 406. Optionally, when data is requested by a caller or server application 404, as described elsewhere in this disclosure, component 418 sends data 418 to server application 404.

Figure 5:
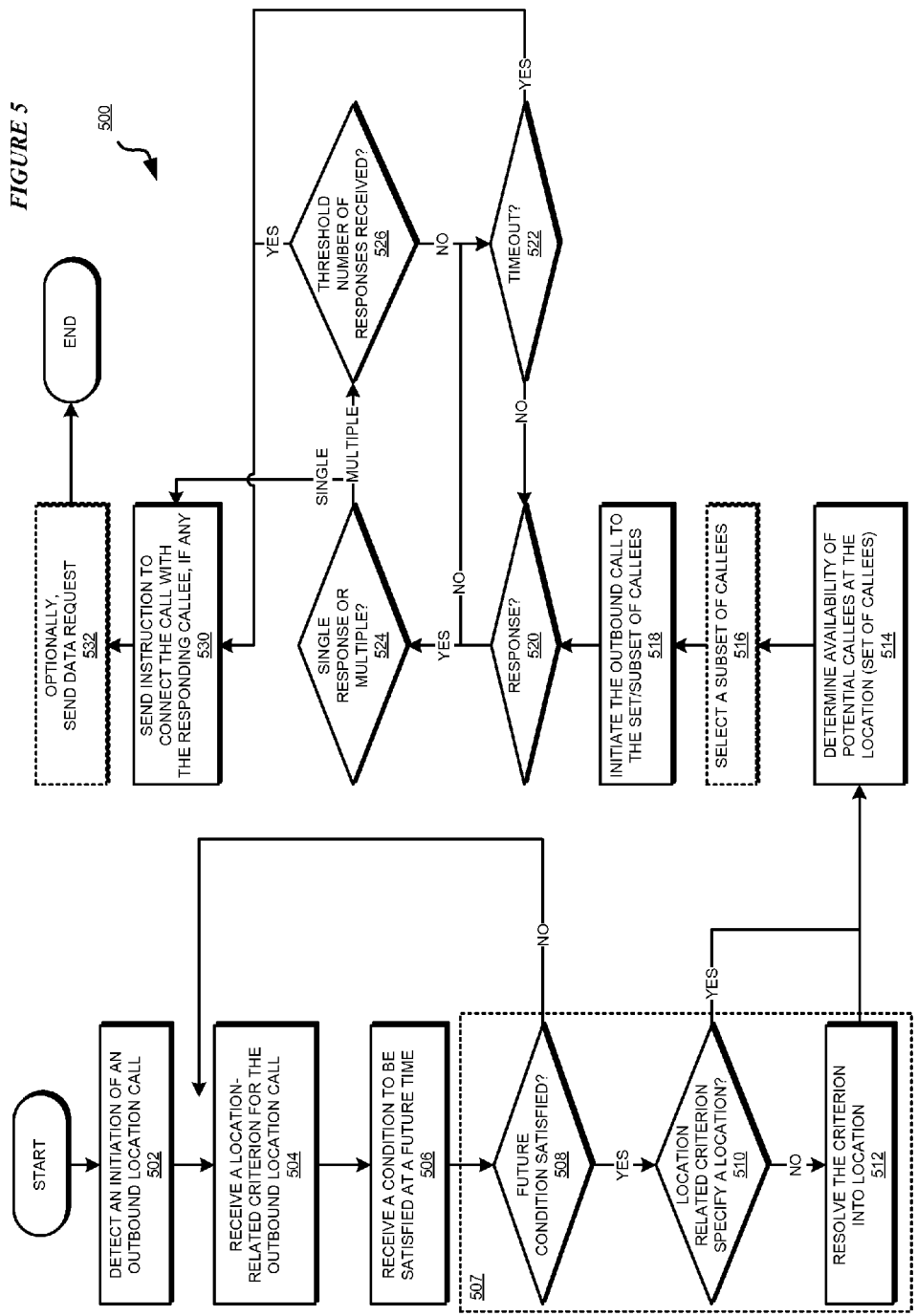
FIG. 5 depicts a flowchart of an example process for future location-based communication with mobile devices in accordance with an illustrative embodiment.

With reference to FIG. 5, this figure depicts a flowchart of an example process for future location-based communication with mobile devices in accordance with an illustrative embodiment. Process 500 can be implemented in application 302 in FIG. 3.

The application detects an initiation of an outbound location call (block 502). The application receives a location-related criterion for the outbound location call (block 504). Any number of location-related criteria can be specified in block 504.

The application receives a future time based condition for the outbound location call (block 506). Any number of future time based conditions can be specified in block 504.

The application enters block 507 in which determinations 508 and 510 are made. In cases where the location is not determined until the future time based condition is satisfied, the determination of block 508 is performed prior to the determination of block 510. In cases where the location is determined or determinable without waiting for the future time based condition to be satisfied, the determination of block 510 can be, but need not be, performed prior to the determination of block 508.

The application determines whether one or more of the future time based conditions have been satisfied (block 508). If the conditions that have to be satisfied are not satisfied ("No" path of block 508), the application returns to block 508. When the conditions that have to be satisfied are satisfied ("Yes" path of block 508), the application proceeds to the next block, which is block 510 in the example depiction.

The application determines whether one or more of the criterion specifies a location (block 510). If no criterion specifies a location where the outbound location call is directed ("No" path of block 510), the application resolves a criterion into a location (block 512). For example, if the criterion specifies "where event xyz is occurring at time x", the application obtains the information of the event and resolves the location of the event at time x from the obtained information in block 512. The application proceeds to block 514 thereafter.

If a criterion specifies a location where the outbound location call is directed ("Yes" path of block 510), the application causes the availability of potential callees at the location to be determined, such as by requesting server application 304 in FIG. 3 to make the determination, (block 514). The available potential callees at the location form a set of callees. Optionally, when the set of callees is available or accessible to the application, the application may select a subset of the callees (block 516). For example, in one embodiment, when several potential callees satisfy a future time based condition, at block 516, the application selects those one or more callees in the subset who satisfy the condition by exceeding a degree of satisfaction.

The application initiates the outbound location call to the set of callees or a selected subset thereof, as the case may be (block 518). For example, when block 516 is not executed, the outbound location call is initiated to the set of callees.

The application determines whether a callee has responded, i.e., accepted the location call (block 520). If no callee has accepted the location call while the location call is still active and pending ("No" path of block 520), the application determines whether a timeout period has elapsed (block 522). The timeout may be a default configuration of the application or a server application. The timeout may also be configured as a criterion in block 504.

If the timeout period has not elapsed ("No" path of block 522), the application returns to block 520. If the timeout period has elapsed ("Yes" path of block 522), the application proceeds to block 530.

If a callee has responded, i.e., accepted the location call ("Yes" path of block 520), the application determines whether a criterion in block 504 or a parameter of the outbound location call configuration prefers a single callee to respond or multiple callees to respond (block 524). If multiple callees are preferred ("Multiple" path of block 524), the application determines whether a threshold number of responses have been received (block 526).

If the threshold number of responses have not yet been received ("No" path of block 526), the application proceeds to block 522 to determine whether the timeout period has elapsed. If the timeout period has elapsed ("Yes" path of block 522), the application sends an instruction to connect the location call with the responding one or more callees (block 530). If only a single callee was expected to respond ("Single" path of block 524), the application performs block 530 as well. If a threshold number of callees have responded ("Yes" path of block 526), the application performs block 530 as well.

An implementation of block 530 may also connect the caller with the one or more callees as the callees respond. For example, such a connection may be progressively established with responding callees as the callees accept the location call in the form of a voice call, a video call, a conference or bridged call, or as text messaging in the form of a group chat.

Optionally, in addition to sending the instruction in block 530, the application may also send a data request as described elsewhere in this disclosure (block 532). The application ends process 500 thereafter.

Figure 6:
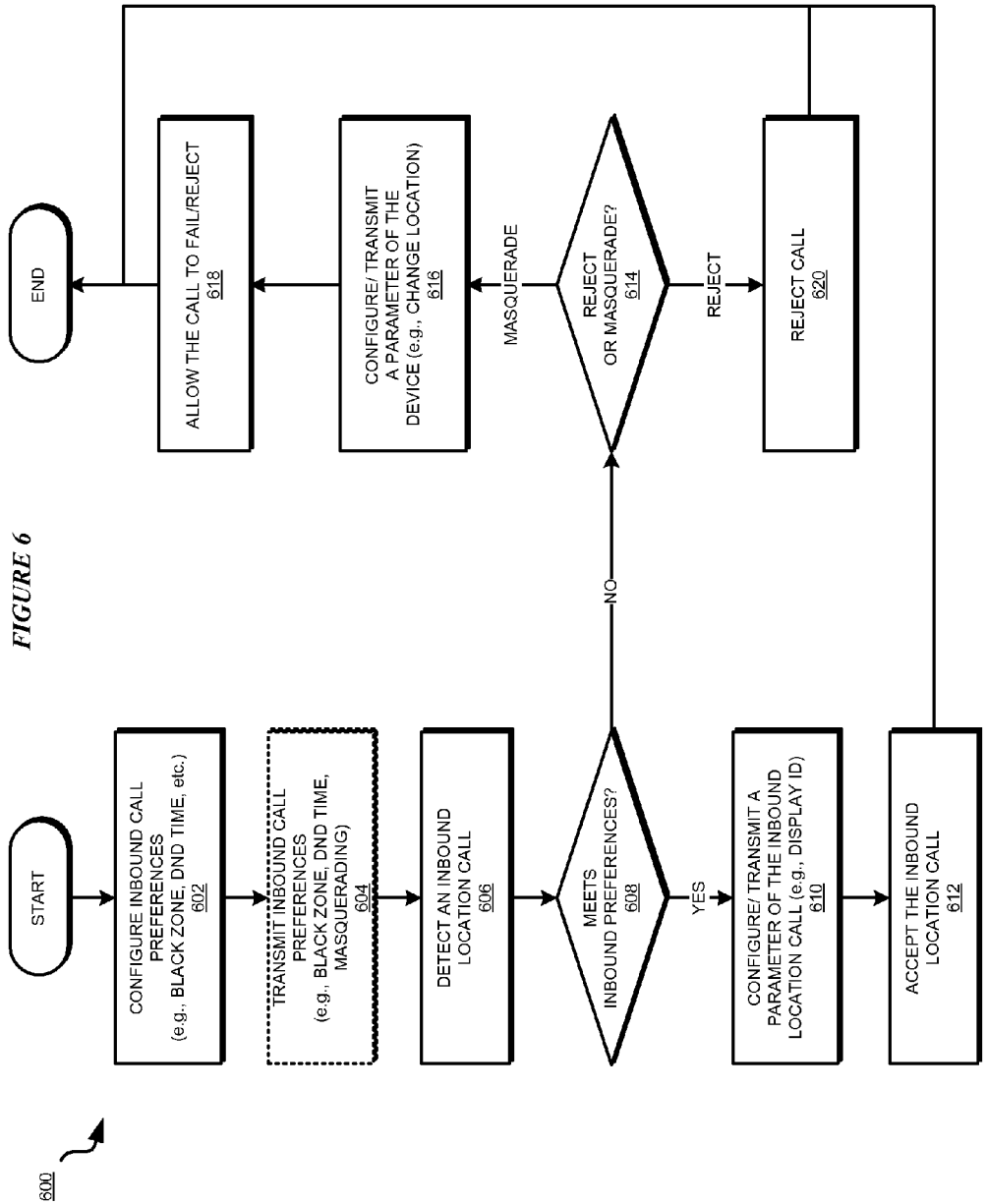
FIG. 6 depicts a flowchart of another example process for future location-based communication with mobile devices in accordance with an illustrative embodiment.

With reference to FIG. 6, this figure depicts a flowchart of another example process for future location-based communication with mobile devices in accordance with an illustrative embodiment. Process 600 can be implemented in application 402 in FIG. 4.

The application configures a preference for an inbound location call (block 602). The application optionally transmits one or more preferences to a server application, such as to server application 404 in FIG. 4 (block 604).

Many possible preferences can be configured in blocks 602 and 604. For example, one embodiment allows a potential callee to masquerade the location of the potential callee's device as being present everywhere, to wit, anywhere a caller might want to place a location call. The embodiment thus enables the potential callee to accept or reject a location call based on other preferences when the call is actually received.

As an example, masquerading the location such that the location of the callee meets any location criterion of the caller may be restricted to only some callers, such as a list of previous callers, known callers, or callers meeting certain criteria. Such masquerading allows the potential callee to pretend to be present wherever a caller expects some callee to be present. For example, a salesperson could masquerade the location of the salesperson's device to associate the salesperson's device with the locations of multiple sites of a company, such that the salesperson receives a location call regardless of which site a caller intends for a location call. These examples of preferences and configurations are not intended to be limiting. From this disclosure, those of ordinary skill in the art will be able to conceive many other preferences, configurations, and manners of masquerading, and the same are contemplated within the scope of the illustrative embodiments.

The application detects an inbound location call (block 606). The application determines whether the inbound location call meets a combination of the configured inbound preferences (block 608). If the inbound location call meets a combination of the configured inbound preferences ("Yes" path of block 608), the application configures a parameter to be used with the inbound location call (block 610). For example, the application configured the call such that the caller can receive information about the callee, such as the callee's identity, a number or identifier associated with the mobile device where the application is executing, a normalized form of the identity or the identifier, or other similarly purposed information. In some cases, the application may transmit the parameter configured in block 610 to a server application.

The application accepts the inbound location call (block 612). The application ends process 600 thereafter.

If the inbound location call does not meet a combination of the configured inbound preferences ("No" path of block 608), the application determines whether to reject the call or masquerade a device location to avoid the call (block 614).

If the application decides to masquerade a device feature, such as the location of the device ("Masquerade" path of block 614), the application configures and/or transmits a changed parameter of the mobile device (block 616). The application then allows the inbound location call to fail (block 618). The application ends process 600 thereafter.

If the application decides to reject the call ("Reject" path of block 614), the application rejects the inbound location call (block 620). The application ends process 600 thereafter.

Thus, a computer implemented method, system or apparatus, and computer program product are provided in the illustrative embodiments for future location-based communication with mobile devices. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for location-based communication with mobile devices, the method comprising:
   receiving, at a device associated with a caller, a condition, wherein the condition has to be satisfied by a callee at a future time and at a location, the location being a place where different callees with different mobile devices are present at different times;
   receiving, at the device, an instruction for making a telecommunication call to the location, wherein the callee is present with a mobile device at the location at the future time and satisfies the condition at the location at the future time, therefore the call is made to the mobile device of the callee in order to call the location;
   determining, responsive to the instruction including a criterion that must be satisfied by the callee, whether the criterion specifies the location; and
   resolving, responsive to the criterion not specifying the location, the criterion to the location;
   identifying a set of potential callees, wherein each mobile device associated with each callee in the set of potential callees is present at the location at the future time, and wherein each potential callee in the set of potential callees satisfies the condition; and
   initiating, using a processor and a memory in the device associated with the caller, the telecommunication call to mobile devices associated with a subset of potential callees, the subset of potential callees including the callee.

2. The method of claim 1, further comprising:
   receiving the set of potential callees at the device associated with the caller;
   determining that different potential callees in the set of potential callees satisfy the condition to different degrees of satisfaction at the future time; and
   selecting, at the device associated with the caller, the subset of potential callees such that each potential callee in the subset satisfies the condition to a corresponding degree that exceeds a threshold degree of satisfaction of the condition, wherein the subset of potential callees includes the callee.

3. The method of claim 1, further comprising:
receiving the set of potential callees at the device associated with the caller;
determining that different potential callees in the set of potential callees satisfy the condition at different times; and
selecting, at the device associated with the caller, the subset of potential callees such that each potential callee in the subset satisfies the condition at the future time, wherein the subset of potential callees includes the callee.

4. The method of claim 1, further comprising:
receiving the condition as a part of receiving a set of conditions,
wherein the condition is a part of a subset of the set of conditions that has to be satisfied by the callee at the future time and at the location,
wherein each location in a set of different locations is accepted as the location for satisfying the condition, and
wherein the potential callees in the set of potential callees are present at the different locations in the set of different locations.

5. The method of claim 1, further comprising:
identifying an identifier of a particular mobile device of a particular potential callee in the subset of potential callees only by using a location of the particular mobile device at the future time when the particular potential callee satisfies the condition; and
determining that the particular potential callee satisfies the condition by detecting a state of the particular mobile device.

6. The method of claim 1, wherein the mobile device has an associated identifier, and wherein the callee, the mobile device, and the identifier change at the location at a second time.

7. The method of claim 1, further comprising:
determining that the instruction includes a location-related criterion that must be satisfied by the callee;
determining that the location is ascertained when the condition is satisfied at the future time; and
resolving, the criterion to the location after the condition is satisfied at the future time.

8. The method of claim 1, wherein an identifying information of any potential callee in the subset of potential callees is unknown to the caller, and wherein an identifier of any mobile device of any potential callee in the subset of potential callees is also unknown to the caller.

9. The method of claim 1, further comprising:
transmitting the instruction to a service provider system;
receiving, from the service provider system, at the device associated with the caller, and at the future time, an indication that each mobile device associated with each potential callee in set of potential callees is present at the location; and
determining, at the device associated with the caller, that each potential callee in the subset of potential callees satisfies the condition, thereby selecting the subset of potential callees.

10. The method of claim 1, further comprising:
transmitting the instruction and the condition to a service provider system;
receiving, from the service provider system, at the device associated with the caller, and at the future time, a first indication that each mobile device associated with each callee in set of potential callees is present at the location; and receiving, from the service provider system, at the device associated with the caller, and at the future time, a second indication that each potential callee in the subset of potential callees satisfies the condition, thereby selecting the subset of potential callees.

11. A computer usable program product comprising a computer readable storage device including computer usable code at a device associated with a caller, for location-based communication with mobile devices, the computer usable code comprising:
computer usable code for receiving, at the device associated with the caller, a condition, wherein the condition has to be satisfied by a callee at a future time and at a location, the location being a place where different callees with different mobile devices are present at different times;
computer usable code for receiving, at the device, an instruction for making a telecommunication call to the location, wherein the callee is present with a mobile device at the location at the future time and satisfies the condition at the location at the future time, therefore the call is made to the mobile device of the callee in order to call the location;
computer usable code for determining, responsive to the instruction including a criterion that must be satisfied by the callee, whether the criterion specifies the location; and
computer usable code for resolving, responsive to the criterion not specifying the location, the criterion to the location;
computer usable code for identifying a set of potential callees, wherein each mobile device associated with each callee in the set of potential callees is present at the location at the future time, and wherein each potential callee in the set of potential callees satisfies the condition; and
computer usable code for initiating, using the device associated with the caller, the telecommunication call to mobile devices associated with a subset of potential callees, the subset of potential callees including the callee.

12. The computer usable program product of claim 11, further comprising:
computer usable code for receiving the set of potential callees at the device associated with the caller;
computer usable code for determining that different potential callees in the set of potential callees satisfy the condition to different degrees of satisfaction at the future time; and
computer usable code for selecting, at the device associated with the caller, the subset of potential callees such that each potential callee in the subset satisfies the condition to a corresponding degree that exceeds a threshold degree of satisfaction of the condition, wherein the subset of potential callees includes the callee.

13. The computer usable program product of claim 11, further comprising:
computer usable code for receiving the set of potential callees at the device associated with the caller;
computer usable code for determining that different potential callees in the set of potential callees satisfy the condition at different times; and
computer usable code for selecting, at the device associated with the caller, the subset of potential callees such that each potential callee in the subset satisfies the condition at the future time, wherein the subset of potential callees includes the callee.

14. The computer usable program product of claim 11, further comprising:
computer usable code for receiving the condition as a part of receiving a set of conditions,
computer usable code for wherein the condition is a part of a subset of the set of conditions that has to be satisfied by the callee at the future time and at the location,
  wherein each location in a set of different locations is accepted as the location for satisfying the condition, and
  wherein the potential callees in the set of potential callees are present at the different locations in the set of different locations.

15. The computer usable program product of claim 11, further comprising:
computer usable code for identifying an identifier of a particular mobile device of a particular potential callee in the subset of potential callees only by using a location of the particular mobile device at the future time when the particular potential callee satisfies the condition; and
computer usable code for determining that the particular potential callee satisfies the condition by detecting a state of the particular mobile device.

16. The computer usable program product of claim 11, wherein the mobile device has an associated identifier, and wherein the callee, the mobile device, and the identifier change at the location at a second time.

17. The computer usable program product of claim 11, wherein the computer usable code is stored in a computer readable storage device in a data processing system, and wherein the computer usable code is transferred over a network from a remote data processing system.

18. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

19. A data processing system (device) associated with a caller, for location-based communication with mobile devices, the data processing system comprising:
a storage device, wherein the storage device stores computer usable program code; and
a processor, wherein the processor executes the computer usable program code, and wherein the computer usable program code comprises:
computer usable code for receiving, at the device associated with the caller, a condition, wherein the condition has to be satisfied by a callee at a future time and at a location, the location being a place where different callees with different mobile devices are present at different times;
computer usable code for receiving, at the device, an instruction for making a telecommunication call to the location, wherein the callee is present with a mobile device at the location at the future time and satisfies the condition at the location at the future time, therefore the call is made to the mobile device of the callee in order to call the location;
computer usable code for determining, responsive to the instruction including a criterion that must be satisfied by the callee, whether the criterion specifies the location; and
computer usable code for resolving, responsive to the criterion not specifying the location, the criterion to the location;
computer usable code for identifying a set of potential callees, wherein each mobile device associated with each callee in the set of potential callees is present at the location at the future time, and wherein each potential callee in the set of potential callees satisfies the condition; and
computer usable code for initiating, using the device associated with the caller, the telecommunication call to mobile devices associated with a subset of potential callees, the subset of potential callees including the callee.

* * * * *